US009516183B2

(12) United States Patent
Shibata (10) Patent No.: US 9,516,183 B2
(45) Date of Patent: Dec. 6, 2016

(54) IMAGE READING DEVICE AND IMAGE FORMING APPARATUS

(71) Applicant: KYOCERA Document Solutions Inc., Osaka-shi, Osaka (JP)

(72) Inventor: Naoki Shibata, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/630,333

(22) Filed: Feb. 24, 2015

(65) Prior Publication Data

US 2015/0242718 A1 Aug. 27, 2015

(30) Foreign Application Priority Data

Feb. 26, 2014 (JP) .................................. 2014-036048

(51) Int. Cl.
*G06F 15/00* (2006.01)
*H04N 1/00* (2006.01)

(52) U.S. Cl.
CPC ................................ *H04N 1/00551* (2013.01)

(58) Field of Classification Search
CPC ....................................................... H04N 1/00
USPC ....................................................... 358/1.12
See application file for complete search history.

(56) References Cited

U.S. PATENT DOCUMENTS

| 5,107,344 A * | 4/1992 | Nosaki | H04N 1/00931 358/401 |
| 2008/0259414 A1* | 10/2008 | Kitagawa | H04N 1/00567 358/498 |
| 2012/0070200 A1* | 3/2012 | Hyoki | H04N 1/00018 399/297 |

FOREIGN PATENT DOCUMENTS

JP 2005167849 A 6/2005

* cited by examiner

*Primary Examiner* — Mark Milia
(74) *Attorney, Agent, or Firm* — Alleman Hall McCoy Russell & Tuttle LLP (57) ABSTRACT

In an image reading device, an image reading portion is fixed at a predetermined position on a route on which a document sheet is conveyed by a document sheet conveying portion, and can read an image from the document sheet. A color reference plate is disposed opposingly to the image reading portion, and is a member having a predetermined reference color at a part thereof opposing the image reading portion. An oscillation portion can oscillate the color reference plate in one of or both a primary scanning direction and a secondary scanning direction. A color reference data setting portion sets, based on image data read from the color reference plate by the image reading portion when the color reference plate is being oscillated by the oscillation portion, color reference data to be used for shading correction executed on image data read from the document sheet by the image reading portion.

5 Claims, 10 Drawing Sheets

IMAGE READING DEVICE AND IMAGE FORMING APPARATUS

INCORPORATION BY REFERENCE

This application is based upon and claims the benefit of priority from the corresponding Japanese Patent Application No. 2014-036048 filed on Feb. 26, 2014, the entire contents of which are incorporated herein by reference.

BACKGROUND

The present disclosure relates to an image reading device for reading an image from a document sheet, and an image forming apparatus including the same.

An image reading device for reading an image from a document sheet using an image reading portion fixed at a predetermined position on a conveying route of the document sheet, is known. The image reading portion is an imaging element such as, for example, a CIS (Contact Image Sensor). In this type of image reading device, color reference data to be used for shading correction executed on image data read from the document sheet is set based on image data read from a color reference plate disposed opposingly to the image reading portion.

SUMMARY

An image reading device according to one aspect of the present disclosure includes a document sheet conveying portion, an image reading portion, a color reference plate, an oscillation portion, and a color reference data setting portion. The document sheet conveying portion can convey a document sheet. The image reading portion is fixed at a predetermined position on a route on which the document sheet is conveyed by the document sheet conveying portion, and can read an image from the document sheet. The color reference plate is disposed opposingly to the image reading portion, and is a member having a predetermined reference color at a part thereof opposing the image reading portion. The oscillation portion can oscillate the color reference plate in one of or both a primary scanning direction and a secondary scanning direction. The color reference data setting portion is configured to set, based on image data read from the color reference plate by the image reading portion when the color reference plate is being oscillated by the oscillation portion, color reference data to be used for shading correction executed on image data read from the document sheet by the image reading portion.

An image forming apparatus according to another aspect of the present disclosure includes the image reading device, and an image forming portion configured to form an image based on image data read by the image reading device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In the following, embodiments of the present disclosure will be described with reference to the accompanying drawings for the understanding of the present disclosure. It should be noted that the following embodiments are examples embodying the present disclosure, and, by nature, do not limit the technical scope of the present disclosure.

[Schematic Configuration of Image Forming Apparatus 10]

First, with reference to FIGS. 1 to 4, a schematic configuration of an image forming apparatus 10 according to an embodiment of the present disclosure will be described. It should be noted that, hereinafter, description is provided sometimes using a primary scanning direction D1 and a secondary scanning direction D2 shown in FIGS. 1 to 4.

Figure 1:
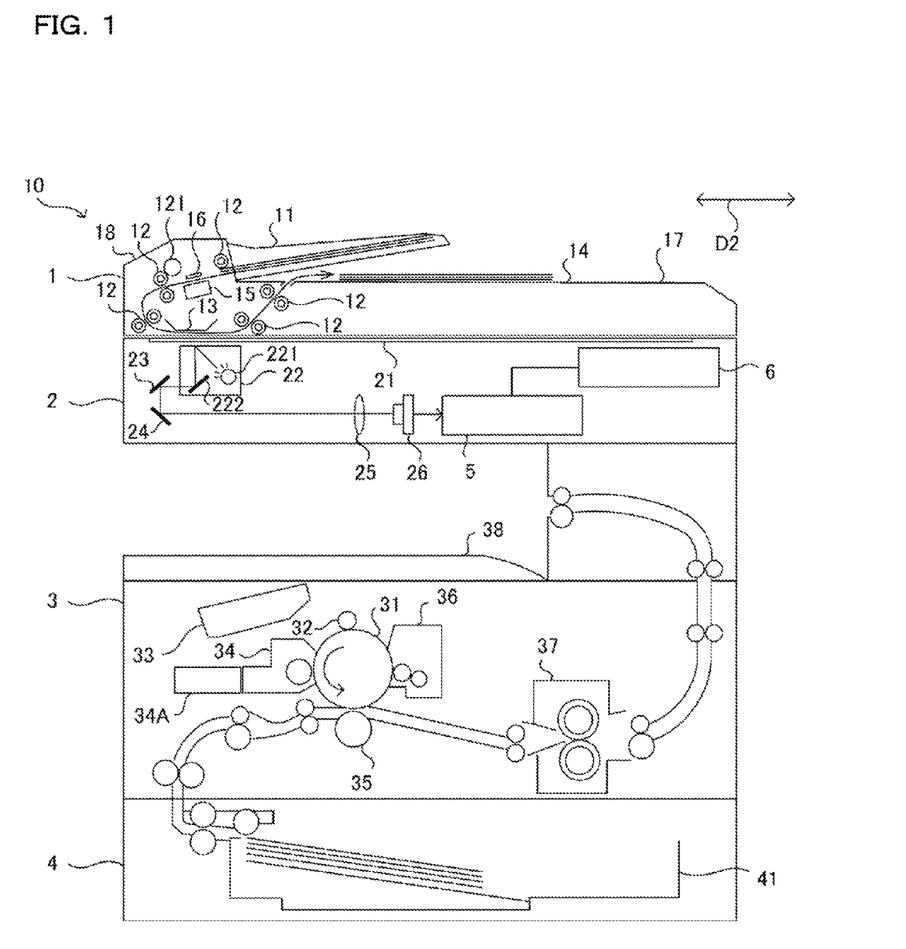
FIG. 1 shows a configuration of an image forming apparatus according to an embodiment of the present disclosure.
Figure 2:
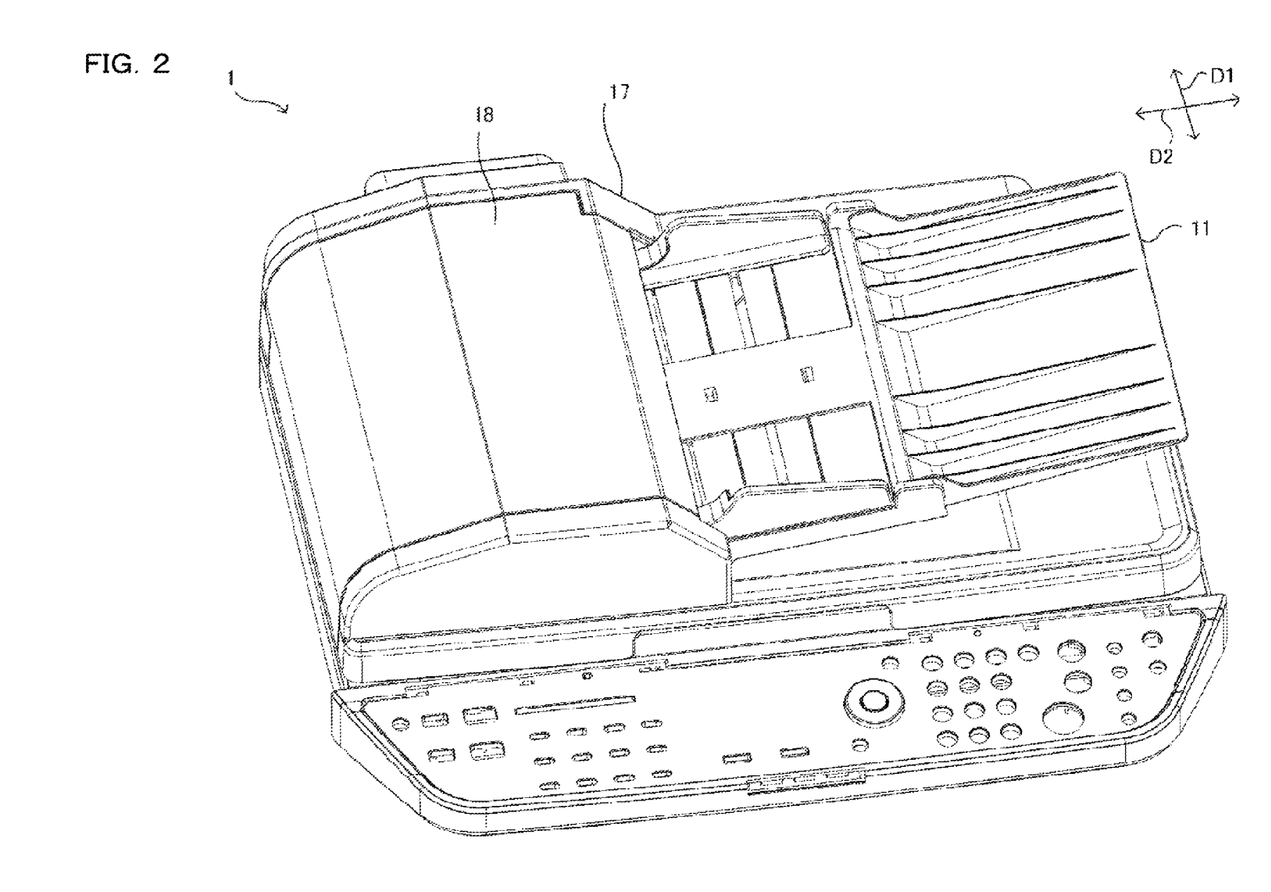
FIG. 2 shows a state in which a cover member of an ADF according to the embodiment of the present disclosure is closed.

As shown in FIG. 1, the image forming apparatus 10 includes an ADF 1, a first image reading portion 2, an image forming portion 3, a sheet feeding portion 4, a control portion 5, and an operation display portion 6. The image forming apparatus 10 is a multifunction peripheral having a print function, a fax function, a scanning function, and a copy function, etc. In the present embodiment, a device including the ADF 1 and the control portion 5 is one example of the image reading device according to the present disclosure. The present disclosure is also applicable to image forming apparatuses or image reading devices such as copy machines, facsimiles, or scanners.

The control portion 5 includes a CPU, a ROM, and a RAM. The CPU is a processor configured to execute various computation processes. The ROM is a nonvolatile storage portion in which information such as control programs configured to cause the CPU to execute various processes is stored in advance. The RAM is a volatile storage portion and is used as a temporary storage memory (workspace) for the various processes executed by the CPU. The control portion 5 may be an electric circuit such as an ASIC or a DSP.

The operation display portion 6 includes an operation portion such as a touch panel and an operation button for receiving operational inputs with respect to the control portion 5, and a display portion such as a liquid crystal panel used by the control portion 5 for displaying various information.

The first image reading portion 2 includes a document sheet table 21, a reading unit 22, a mirror 23, a mirror 24, an optical lens 25, and a CCD (Charge Coupled Device) 26. The document sheet table 21 is a portion that is disposed on the top surface of the first image reading portion 2 and where a document sheet is to be placed. The reading unit 22 is movable in the secondary scanning direction D2 that is orthogonal to the primary scanning direction D1. The reading unit 22 includes an LED light source 221 and a mirror 222.

The LED light source 221 includes a large number of white LEDs arranged in the primary scanning direction D1. The mirror 222 reflects, toward the mirror 23, light that has been emitted from the LED light source 221 and reflected on the surface of a document sheet located at a reading position on the document sheet table 21. Then, the light reflected by the mirror 222 is guided to the optical lens 25 by the mirror 23 and the mirror 24. The optical lens 25 condenses the incoming light and causes the light to enter the CCD 26. The CCD 26 has a photoelectric conversion element or the like that inputs, to the control portion 5 as an image data of the document sheet, an electrical signal in accordance with the amount of received light that has entered from the optical lens 25.

The image forming portion 3 is an electronic photograph type image forming portion that can execute an image formation process (printing process) of forming an image, based on image data read by the ADF 1 or the first image reading portion 2. The image forming portion 3 can also execute the image formation process based on image data inputted from an information processing apparatus such as an external personal computer.

Specifically, the image forming portion 3 includes a photosensitive drum 31, a charging device 32, a laser scanning unit (LSU) 33, a developing device 34, a transfer roller 35, a cleaning device 36, a fixing device 37, and a sheet discharge tray 38. At the image forming portion 3, an image is formed by the following steps on a sheet supplied from a sheet feed cassette 41 that is detachable/reattachable with respect to the sheet feeding portion 4, and the sheet after having the image formed thereon is discharged to the sheet discharge tray 38. The sheet is a sheet material such as paper, coated paper, a postcard, an envelope, and an OHP sheet.

First, the photosensitive drum 31 is uniformly charged to a predetermined potential by the charging device 32. Next, light based on the image data is irradiated on the surface of the photosensitive drum 31 by the laser scanning unit 33. With this, an electrostatic latent image corresponding to the image data is formed on the surface of the photosensitive drum 31. Then, the electrostatic latent image on the photosensitive drum 31 is developed (visualized) as a toner image by the developing device 34. On the developing device 34, a toner (developer) is supplied from a toner container 34A that is detachable/reattachable with respect to the image forming portion 3. Next, the toner image formed on the photosensitive drum 31 is transferred onto a sheet by the transfer roller 35. Then, the toner image transferred on the sheet is heated by the fixing device 37 to be melted and fixed. Any toner remaining on the surface of the photosensitive drum 31 is removed by the cleaning device 36.

Figure 3:
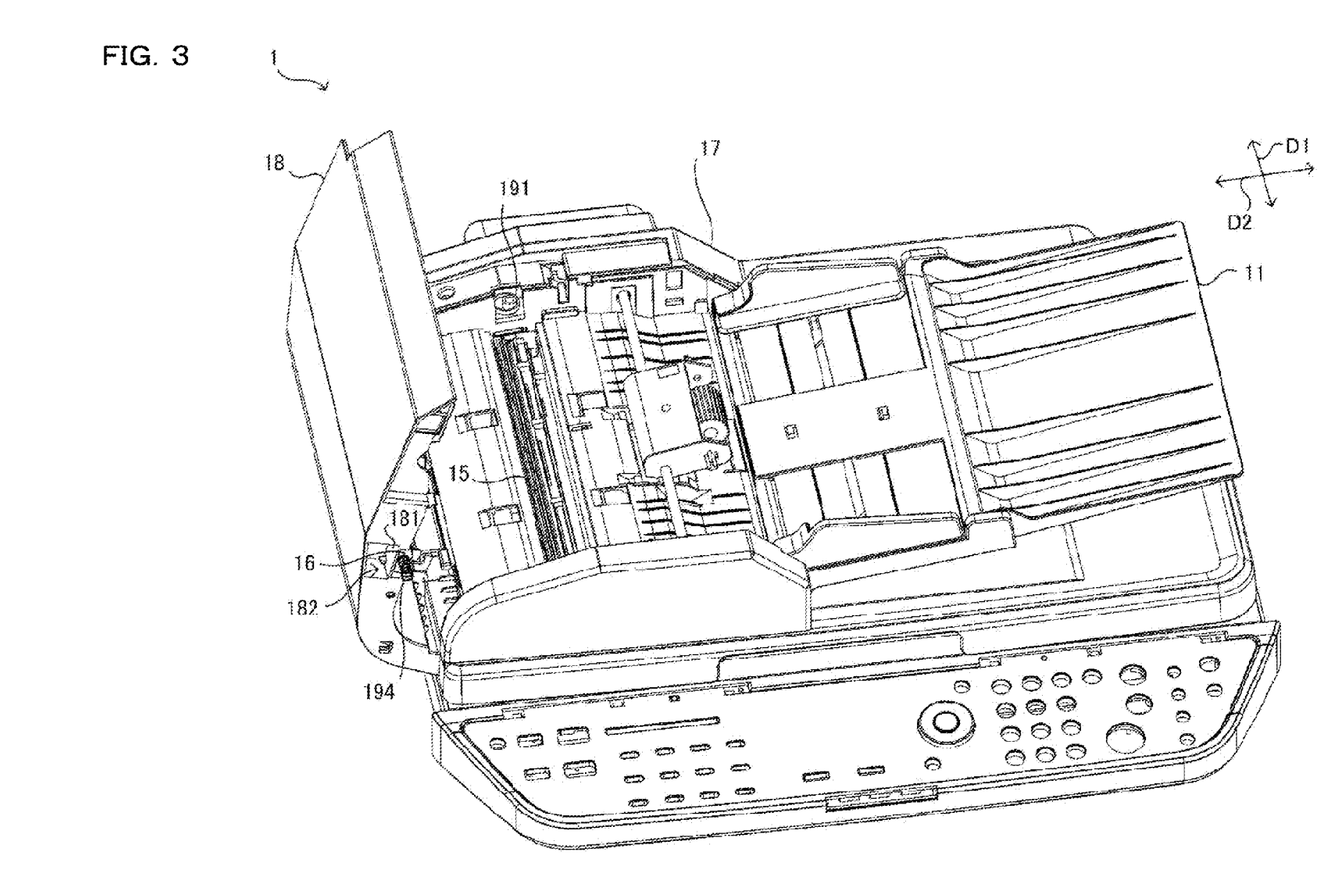
FIG. 3 shows a state in which the cover member of the ADF according to the embodiment of the present disclosure is open.
Figure 4:
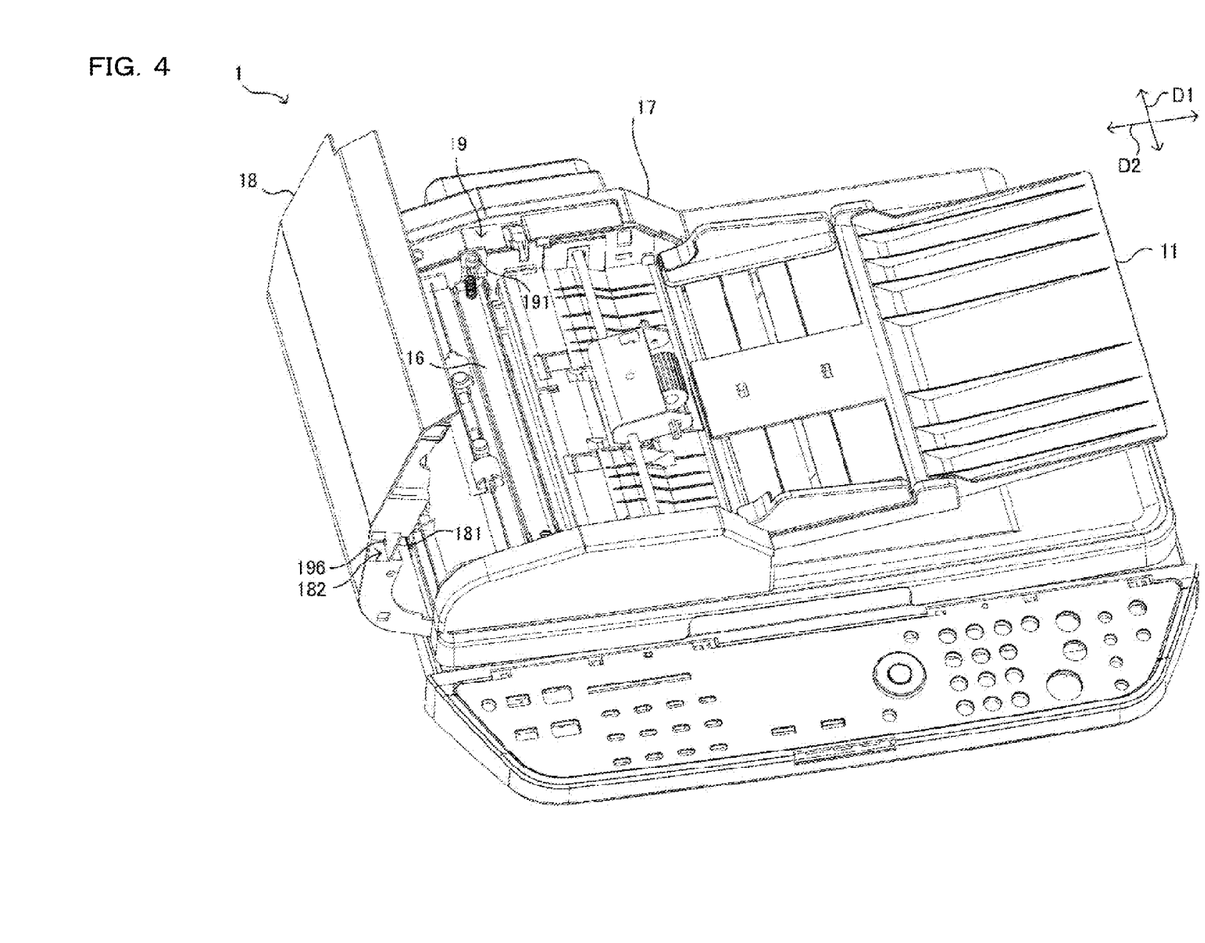
FIG. 4 is for describing a positional relationship of a color reference plate of the ADF according to the embodiment of the present disclosure.

As shown in FIGS. 1 to 4, the ADF 1 is an automatic document sheet conveying device including a document sheet setting portion 11, a plurality of conveying rollers 12, a document sheet holding portion 13, a sheet discharge portion 14, a second image reading portion 15, a color reference plate 16, a unit case 17, a cover member 18, and an oscillation mechanism 19, etc. The cover member 18 can be opened or closed with respect to the unit case 17. FIG. 4 shows a state in which the color reference plate 16 is disposed at a position opposing the second image reading portion 15.

At the ADF 1, a document sheet is conveyed as a result of each of the conveying rollers 12 being driven by a drive motor 121. Here, the conveying rollers 12 and the drive motor 121 are one example of a document sheet conveying portion. Specifically, at the ADF 1, a document sheet placed on the document sheet setting portion 11 passes a bottom surface of the document sheet holding portion 13 which is a position where the first image reading portion 2 reads image data, and is conveyed to the sheet discharge portion 14. At this moment, the first image reading portion 2 can read an image on one surface (hereinafter, referred to as a front surface) of the document sheet conveyed by the ADF 1. In addition, at the ADF 1, the second image reading portion 15 can read an image on the other surface (hereinafter, referred to as a back surface) of the document sheet conveyed by the ADF 1. Thus, the image forming apparatus 10 can simultaneously read images on the front and back surfaces of the document sheet conveyed by the ADF 1, using the first image reading portion 2 and the second image reading portion 15.

At the document sheet holding portion 13, a part opposing the position where the CCD 26 reads image data is formed to have a reference color for setting color reference data used in shading correction executed by the control portion 5 on image data read by the CCD 26. For example, the reference color is white. Since the reading unit 22 is movable in the secondary scanning direction D2, the effect of any color irregularity such as a stain or a scratch on the document sheet holding portion 13 on the color reference data is suppressed by reading the image on the document sheet holding portion 13 by the CCD 26 while moving the reading unit 22 in the secondary scanning direction D2.

The second image reading portion 15 is disposed and fixed on the unit case 17 at a predetermined position on a route on which a document sheet is conveyed by each of the conveying rollers 12. The second image reading portion 15 includes a light source such as a plurality of LEDs for emitting light by an amount corresponding to a single line in the primary scanning direction D1, and a CIS (Contact Image Sensor) having a plurality of photoelectric conversion elements disposed side-by-side in the primary scanning direction D1. The second image reading portion 15 reads an image from the color reference plate 16 or a document sheet by converting, into electrical signals using the photoelectric conversion elements, reflected light that has been emitted from the light source and irradiated on the color reference plate 16 or the document sheet. The image data read by the second image reading portion 15 is inputted to the control portion 5. Then, at the control portion 5, various well-known image processes such as shading correction are executed with respect to the image data.

The shading correction is an image process for correcting light amount distribution of the light source of the second image reading portion 15 or variability of light-reception sensitivity of the photoelectric conversion elements based on color reference data that has been set in advance. Thus, as described later, the control portion 5 reads the image data from the color reference plate 16 by using the second image reading portion 15 at a timing set in advance, and sets the color reference data based on the image data. It should be noted that the color reference data contains color reference data corresponding to each position of the primary scanning direction D1 of the second image reading portion 15. Although the control portion 5 also executes a similar shading correction on image data read by the first image reading portion 2, the description thereof is omitted here.

When a color irregularity caused by a stain or a scratch is generated on the color reference plate 16, the color reference data that has been set based on the image data read from the color reference plate 16 contains noise, and the accuracy at which an image is read from the document sheet may be reduced. However, in the image forming apparatus 10, the reduction in the accuracy of image reading caused by color irregularities of the reference color on the color reference plate 16 is suppressed, as described in the following.

Figure 5:
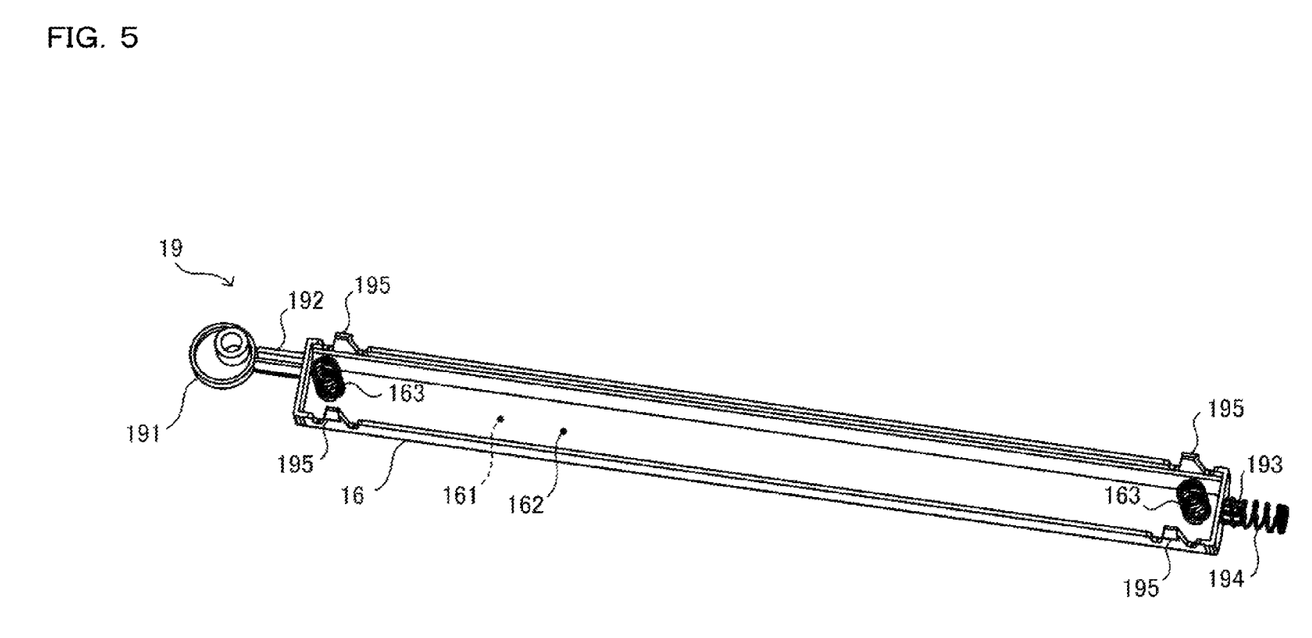
FIG. 5 is for describing an oscillation mechanism of the ADF according to the embodiment of the present disclosure.
Figure 6:
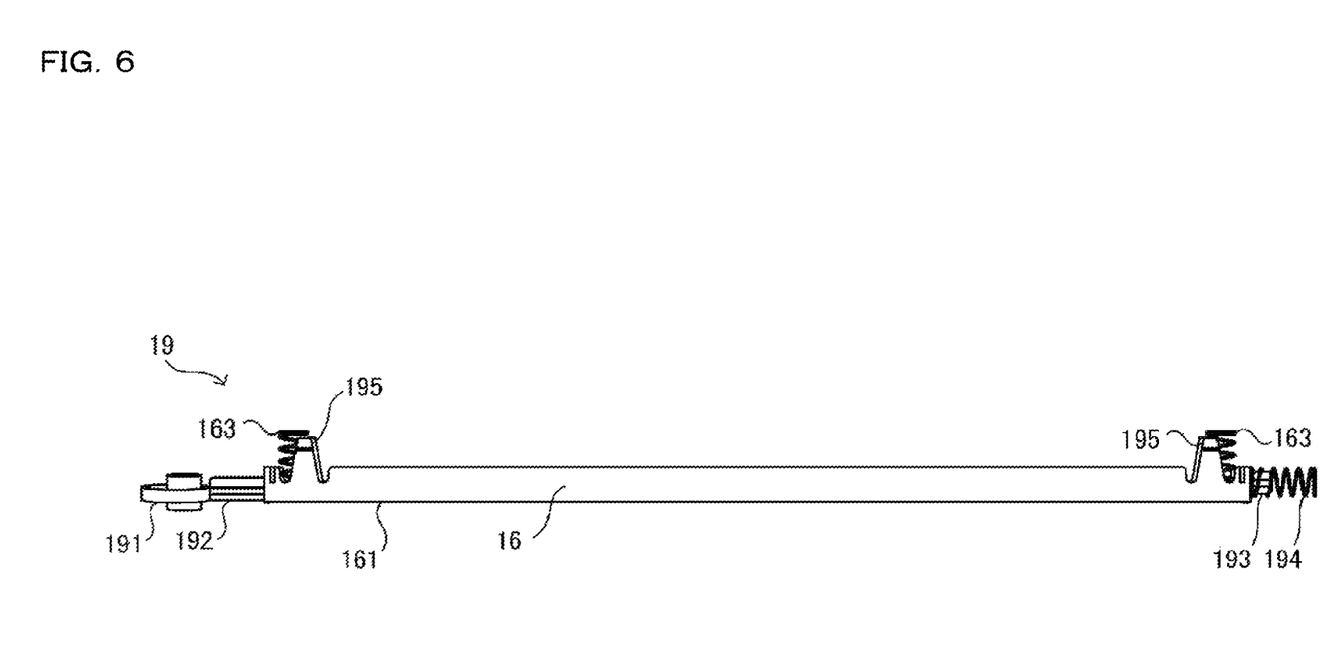
FIG. 6 is for describing the oscillation mechanism of the ADF according to the embodiment of the present disclosure.
Figure 7:
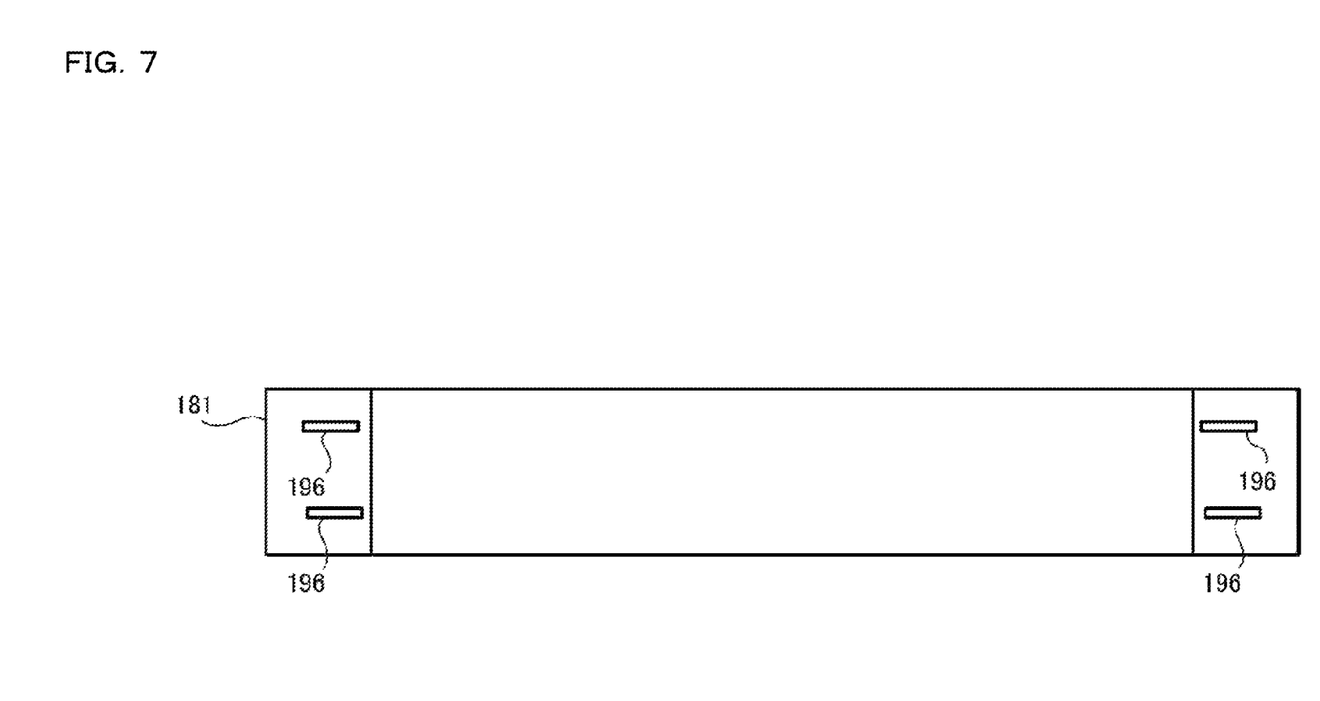
FIG. 7 is for describing the oscillation mechanism of the ADF according to the embodiment of the present disclosure.

Here, the color reference plate 16 and the oscillation mechanism 19 will be described with reference to FIGS. 3 to 7. FIG. 5 is a diagrammatic perspective view showing the color reference plate 16 and the oscillation mechanism 19. FIG. 6 is a front view of the color reference plate 16 and the oscillation mechanism 19 shown in FIG. 5. FIG. 7 is a plan view showing attachment portions 181 of the cover member 18 where the color reference plate 16 is to be attached.

As shown in FIGS. 3 and 4, the color reference plate 16 is attached to the attachment portions 181 of the cover member 18, and is disposed opposingly to the second image reading portion 15 when the cover member 18 is closed. In addition, the color of a front surface 161 which is a part of the color reference plate 16 that opposes the second image reading portion 15 is a predetermined reference color for setting the color reference data used in the shading correction. For example, a sheet that is white which becomes the reference color is pasted on the color reference plate 16. Then, when the cover member 18 is closed, the front surface 161 of the color reference plate 16 is disposed at the position opposing the second image reading portion 15. With this, the second image reading portion 15 can read image data from the front surface 161 of the color reference plate 16.

In addition, the color reference plate 16 includes compression springs 163 fixed on a back surface 162, which is a surface opposite to the front surface 161. In a state where the color reference plate 16 is mounted on the attachment portions 181 of the cover member 18, the compression springs 163 are compressed because of making contact with the attachment portions 181, and urge the color reference plate 16 in a direction away from the attachment portions 181. With this, when the cover member 18 is closed, the color reference plate 16 is urged toward the second image reading portion 15, and adheres closely to the second image reading portion 15.

On the other hand, the oscillation mechanism 19 is one example of an oscillation portion including an eccentric cam 191, a protruding portion 192, a rib 193, an urging member 194, engagement portions 195, and slide grooves 196. The oscillation mechanism 19 can oscillate the color reference plate 16 in the primary scanning direction D1. As shown in FIGS. 3 and 4, the eccentric cam 191 is disposed on the unit case 17. In addition, as shown in FIGS. 5 and 6, the protruding portion 192, the rib 193, the urging member 194, and the engagement portions 195 are disposed on the color reference plate 16. Furthermore, as shown in FIG. 7, the slide grooves 196 are disposed on the attachment portions 181 of the cover member 18.

The eccentric cam 191 can be rotated by a driving force of the drive motor 121 that drives each of the conveying rollers 12 of the ADF 1. Specifically, the eccentric cam 191 is coupled to the drive motor 121 through a transmission drive system such as various gears linked to a rotational shaft of the drive motor 121. With this, the control portion 5 can rotate the eccentric cam 191 by driving the drive motor 121. The oscillation mechanism 19 may also conceivably have a configuration of including a drive motor for rotating the eccentric cam 191, separately from the drive motor 121.

The protruding portion 192 protrudes outward from an end part of the color reference plate 16 on a side of the eccentric cam 191 in the primary scanning direction D1. In addition, the protruding portion 192 makes contact with an outer circumferential surface of the eccentric cam 191 when the cover member 18 is closed. As a result, the eccentric cam 191 can rotate while having its outer circumferential surface in contact with the protruding portion 192 of the color reference plate 16. Thus, when the eccentric cam 191 rotates and a contact position between the protruding portion 192 and the outer circumferential surface of the eccentric cam 191 in the primary scanning direction D1 changes, the color reference plate 16 moves in a direction away from the eccentric cam 191 in the primary scanning direction D1.

The rib 193 protrudes outward from an end part of the color reference plate 16 on a side opposite of the protruding portion 192 in the primary scanning direction D1. The urging member 194 is a compression spring fitted onto the rib 193 and fixed to the color reference plate 16. When the cover member 18 is closed and the color reference plate 16 is moved in the direction away from the eccentric cam 191 in the primary scanning direction D1 by the eccentric cam 191, the urging member 194 makes contact with an inner wall of the unit case 17 and contracts. Then, the urging member 194 stretches associated with a rotation of the eccentric cam 191 to urge and move the color reference plate 16 in a direction toward the eccentric cam 191 in the primary scanning direction D1. Here, the urging member 194 is one example of an urging portion. Furthermore, the eccentric cam 191 and the protruding portion 192 for intermittently moving the color reference plate 16 in a direction opposite of the direction in which the color reference plate 16 is urged by the urging member 194 are one example of a movement portion.

The engagement portions 195 are protruding portions having a snap fitting shape formed in the vicinity of both ends of the color reference plate 16 in the primary scanning direction D1. The slide grooves 196 are penetration openings formed on the attachment portions 181 so as to correspond to the arrangement positions of the engagement portions 195 on the color reference plate 16. The slide grooves 196 have a width enabling the engagement portions 195 to slide in the primary scanning direction D1 within a predetermined range. As shown in FIGS. 3 and 4, at both ends of the attachment portions 181 in the primary scanning direction D1, gaps 182 are formed between the exterior of the cover member 18 and the attachment portions 181. The slide grooves 196 only penetrate the attachment portions 181 from a mount surface side of the color reference plate 16 to be communicatively connected to the gaps 182, and do not penetrate out to the exterior of the cover member 18.

When the engagement portions 195 are fitted into the slide grooves 196, the engagement portions 195 are prevented from falling since being locked by edges of the slide grooves

196. With this, the color reference plate 16 is supported by the attachment portions 181 in a slidable manner in the primary scanning direction D1 in a range in which the engagement portions 195 are movable within the slide grooves 196.

Figure 8A:
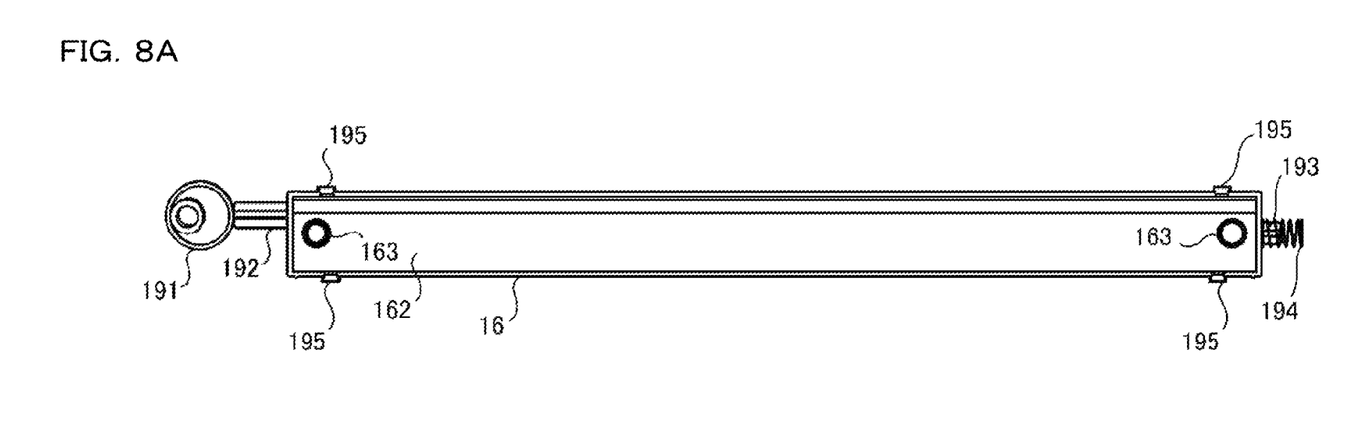
FIG. 8A is for describing the oscillation mechanism of the ADF according to the embodiment of the present disclosure.
Figure 8B:
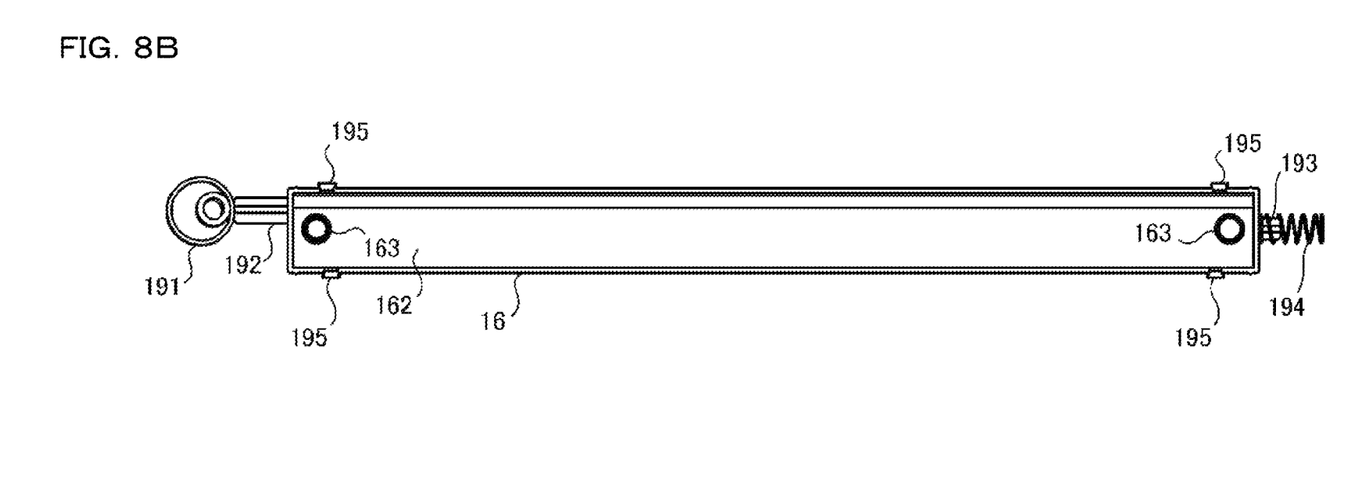
FIG. 8B is for describing the oscillation mechanism of the ADF according to the embodiment of the present disclosure.

FIG. 8A shows a state in which the color reference plate 16 has moved in the direction away from the eccentric cam 191. FIG. 8B shows a state in which the color reference plate 16 has moved in a direction toward the eccentric cam 191.

As shown in FIG. 8A, associated with a rotation of the eccentric cam 191, the color reference plate 16 moves toward the urging member 194 when the protruding portion 192 is pressed by the outer circumferential surface of the eccentric cam 191. At this moment, the urging member 194 is compressed between the color reference plate 16 and the unit case 17 to become contracted.

As shown in FIG. 8B, associated with a rotate of the eccentric cam 191, the color reference plate 16 is urged toward the eccentric cam 191 through stretching of the urging member 194. Thus, in the ADF 1, the color reference plate 16 repeatedly oscillates in the primary scanning direction D1 in accordance with the rotation of the eccentric cam 191.

[Color Reference Data Setting Process]

Figure 9:
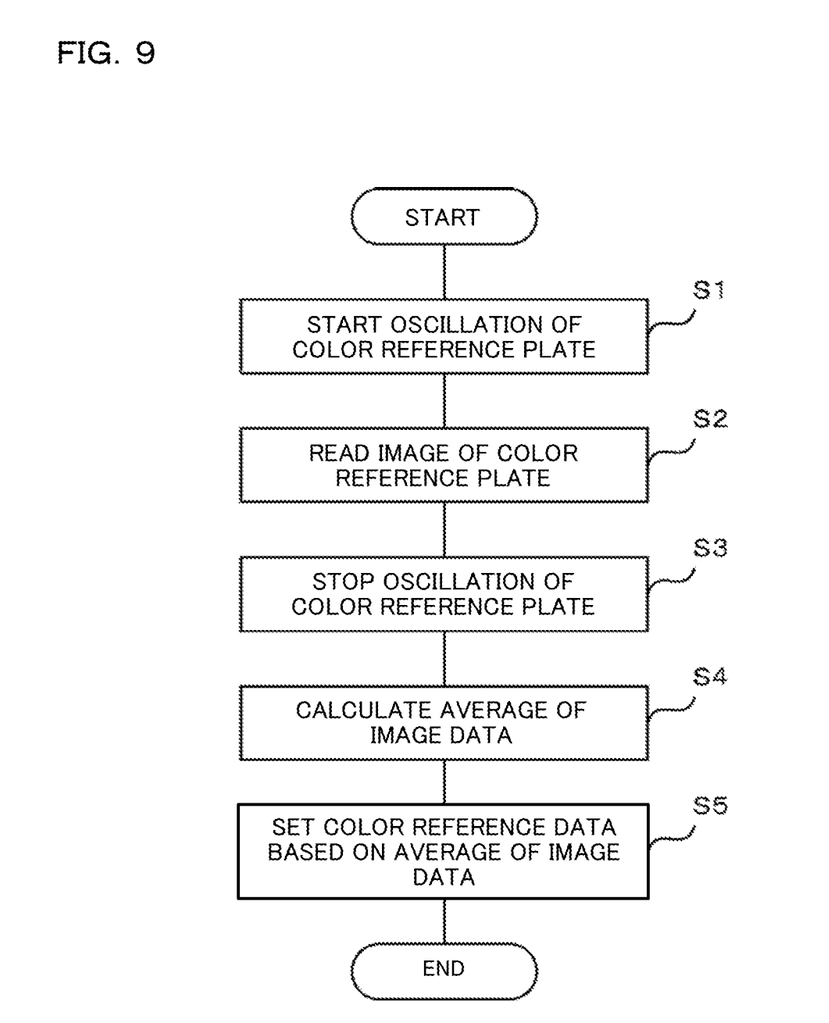
FIG. 9 is a flowchart showing one example of steps in a color reference data setting process executed by the image forming apparatus according to the embodiment of the present disclosure.

In the image forming apparatus 10, the color reference data is set by having the control portion 5 execute a color reference data setting process (cf. FIG. 9). Here, the control portion 5 when executing the color reference data setting process is one example of a color reference data setting portion. In the following, one example of steps of the color reference data setting process will be described with reference to FIG. 9.

It should be noted that the color reference data setting process is executed by the control portion 5 when power of the image forming apparatus 10 is turned on, when the image forming apparatus 10 returns from a power saving mode, when a specific period of time that is set in advance has elapsed, or when a specific number of sheets set in advance has been printed.

<Step S1>

First, at step S1, the control portion 5 rotates the eccentric cam 191 by driving the drive motor 121. With this, at the oscillation mechanism 19, oscillation of the color reference plate 16 in the primary scanning direction D1 starts associated with the rotation of the eccentric cam 191.

<Step S2>

At step S2, the control portion 5 repeatedly, for a predetermined number of times, reads image data from the color reference plate 16 by an amount corresponding to a single line in the primary scanning direction D1 by the second image reading portion 15 when the color reference plate 16 is being oscillated by the oscillation mechanism 19. In the image forming apparatus 10, a reading cycle at which the image data is read by an amount corresponding to a single line and an oscillation cycle at which the color reference plate 16 oscillates are set to be different from each other. Thus, at step S2, the photoelectric conversion elements, disposed side-by-side in the primary scanning direction D1 at the second image reading portion 15, each reads image data from a position different in the primary scanning direction D1 on the color reference plate 16.

<Step S3>

At step S3, the control portion 5 stops oscillation of the color reference plate 16 in the primary scanning direction D1 by shutting down the drive of the drive motor 121 and stopping the rotation of the eccentric cam 191.

<Step S4>

At step S4, the control portion 5 calculates, for each of the photoelectric conversion elements, an average of the image data of the amount corresponding to multiple lines read by each of the photoelectric conversion elements of the second image reading portion 15 at step S2. Thus, the image data, read by the photoelectric conversion elements of the second image reading portion 15 at positions different in the primary scanning direction D1 on the color reference plate 16 as a result of oscillation of the color reference plate 16, are averaged. With this, even when color irregularity has occurred on the color reference plate 16, the color irregularity is diffused. At step S4 described above, although an example of calculating the average of the image data has been described, the present disclosure is not limited thereto, and the control portion 5 may conceivably smooth the image data using other methods. It is also conceivable to have the control portion 5 extract, for each of the photoelectric conversion elements, image data that is closest to the reference color of the color reference plate 16 from among the image data of the amount corresponding to multiple lines, to be used as image data corresponding to the photoelectric conversion element.

<Step S5>

At step S5, the control portion 5 sets the color reference data based on the average of the image data calculated at step S4. For example, the control portion 5 may conceivably set the average of the image data as the color reference data as is. Another conceivable embodiment is one in which the control portion 5 calculates and sets the color reference data by assigning the average of the image data to a predetermined arithmetic expression.

As described above, in the image forming apparatus 10, the color reference data is set based on the average of the image data read from the color reference plate 16 by the second image reading portion 15 while the color reference plate 16 is being oscillated in the primary scanning direction D1 by the oscillation mechanism 19. Thus, the effect, on the color reference data, of any color irregularity caused by a stain or a scratch on the color reference plate 16 can be suppressed, and reduction in image reading accuracy of the second image reading portion 15 caused by the color irregularity of the color reference plate 16 can be suppressed.

Figure 10A:
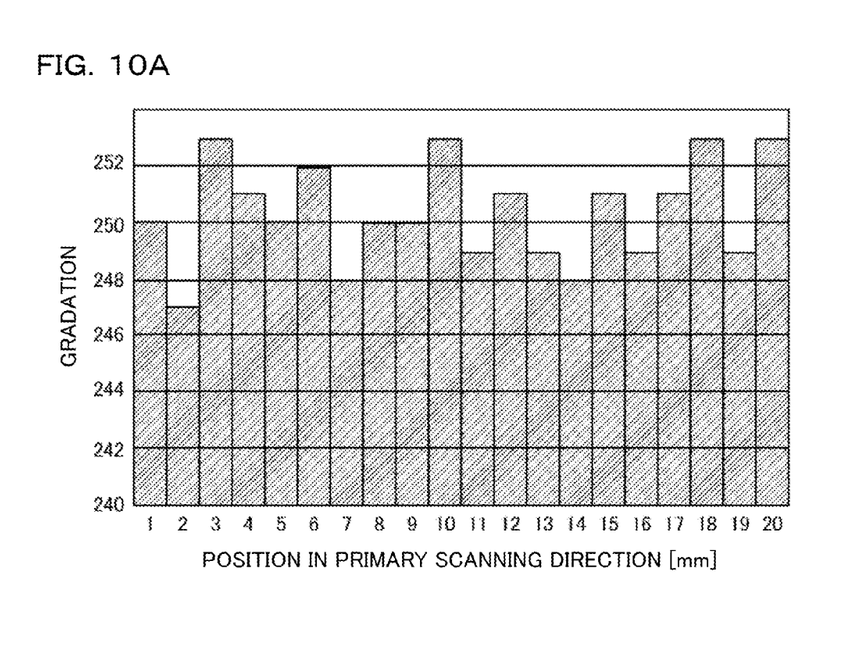
FIG. 10A shows one example of image data read from the color reference plate when the color reference plate is not being oscillated by the oscillation mechanism of the ADF according to the embodiment of the present disclosure.
Figure 10B:
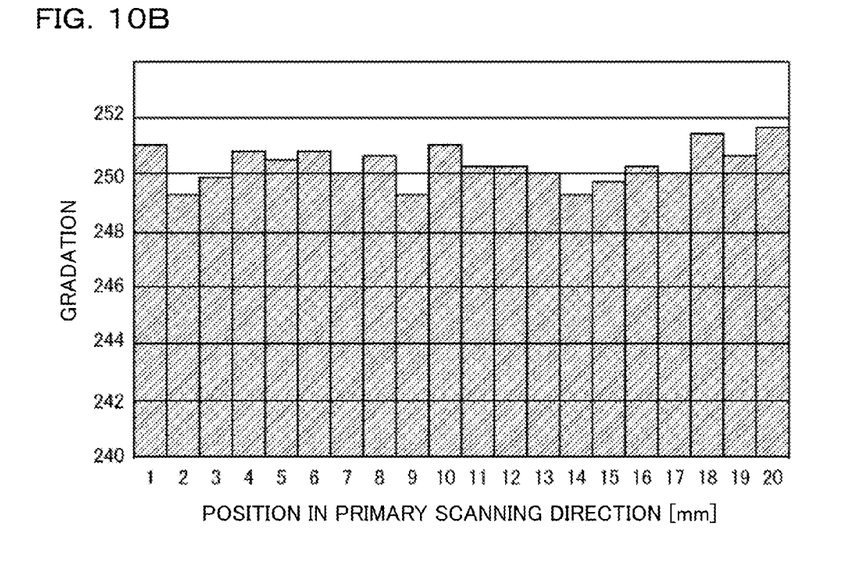
FIG. 10B shows one example of image data read from the color reference plate when the color reference plate is being oscillated by the oscillation mechanism of the ADF according to the embodiment of the present disclosure.

FIG. 10A shows one example of the image data read from the color reference plate 16 by the second image reading portion 15 without the color reference plate 16 being oscillated in the image forming apparatus 10. In addition, FIG. 10B shows one example of the image data read from the color reference plate 16 by the second image reading portion 15 while the color reference plate 16 is being oscillated in the image forming apparatus 10. It should be noted that, in FIGS. 10A and 10B, a gradation of "0" represents black and a gradation of "255" represents white. Furthermore, in the image forming apparatus 10, the color reference plate 16 is moved by the oscillation mechanism 19 at a rate of 1 mm per 0.1 s.

As shown in FIG. 10A, when the color reference plate 16 is not oscillated, the image data read by each of the photoelectric conversion elements of the second image reading portion 15 greatly changes depending on the state of the position on the color reference plate 16 corresponding to each of the photoelectric conversion elements. Thus, the effect, on the color reference data, of any color irregularity caused by a stain or a scratch that may be generated on the color reference plate 16 becomes large.

On the other hand, as shown in FIG. 10B, when the color reference plate 16 is being oscillated, each of the photoelectric conversion elements of the second image reading portion 15 reads image data from different positions on the color reference plate 16. Then, the image data calculated at step S4 is obtained by averaging the image data of each position in the primary scanning direction D1 read by each of the photoelectric conversion elements of the second image reading portion 15. Thus, in the image forming apparatus 10, the effect, on the color reference data, of any color irregularity caused by a stain or a scratch that may be generated on the color reference plate 16 can be suppressed, and reduction in image reading accuracy of the second image reading portion 15 can be suppressed.

In the image forming apparatus 10 according to the embodiment, since the color reference plate 16 can be oscillated in the primary scanning direction D1, the effect on image reading accuracy is small even with a configuration in which the color reference plate 16 is oscillated constantly by the oscillation mechanism 19 while the conveying rollers 12 of the ADF 1 are driven. Another conceivable embodiment is one in which the color reference plate 16 can be oscillated in the secondary scanning direction D2 that is orthogonal to the primary scanning direction D1 and is the conveying direction of a document sheet. In addition, the control portion 5 may set the color reference data based on image data read from the color reference plate 16 by the second image reading portion 15 while the color reference plate 16 is being oscillated in the secondary scanning direction D2. Also in this case, the effect, on the color reference data, of any color irregularity such as a stain or a scratch on the color reference plate 16 can be suppressed, and reduction in image reading accuracy of the second image reading portion 15 can be suppressed.

Furthermore, the oscillation mechanism 19 may have a configuration that enables the color reference plate 16 to oscillate both in the primary scanning direction D1 and the secondary scanning direction D2. For example, similar to the eccentric cam 191, the protruding portion 192, the rib 193, and the urging member 194; the oscillation mechanism 19 may conceivably include an eccentric cam, a protruding portion, a rib, and an urging member, for oscillating the color reference plate 16 in the secondary scanning direction D2. In this case, the control portion 5 may conceivably set the color reference data based on image data read from the color reference plate 16 by the second image reading portion 15 while the color reference plate 16 is being oscillated in one of or both the primary scanning direction D1 and the secondary scanning direction D2.

Furthermore, the ADF 1 may conceivably further include a clutch (one example of a switch portion) for switching between whether or not to transmit the driving force from the drive motor 121 to the eccentric cam 191. More specifically, the clutch may conceivably have a configuration of blocking transmission of the driving force from the drive motor 121 to the eccentric cam 191 in a non-actuation state, and transmitting the driving force from the drive motor 121 to the eccentric cam 191 in an actuation state. In this case, when image data is read from a document sheet conveyed using the ADF 1, the control portion 5 sets the clutch in the non-actuation state to block transmission of the driving force from the drive motor 121 to the eccentric cam 191. On the other hand, at step S1 in the color reference data setting process, the control portion 5 actuates the clutch to enable transmission of the driving force from the drive motor 121 to the eccentric cam 191. By having such a configuration, since oscillation of the color reference plate 16 is not performed when image data is to be read from a document sheet, the effect of oscillation of the color reference plate 16 on the conveying of the document sheet can be prevented.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a document sheet conveying portion comprising a conveying roller configured to convey a document sheet and a drive motor configured to drive the conveying roller;
   an image reading portion fixed at a predetermined position on a route on which the document sheet is conveyed by the document sheet conveying portion, including a plurality of photoelectric conversion elements disposed side-by-side in a primary scanning direction, and configured to read an image from the document sheet;
   a color reference plate disposed oppositely to the image reading portion and having a predetermined reference color at a part thereof opposing the image reading portion;
   an oscillation portion capable of oscillating the color reference plate in at least the primary scanning direction, the oscillation portion comprising an urging portion configured to urge the color reference plate in an urging direction and a movement portion configured to intermittently move the color reference plate in a direction opposite of the urging direction, wherein:
   the urging portion comprises a spring configured to urge the color reference plate in the urging direction; and
   the movement portion comprises an eccentric cam capable of rotating while having an outer circumferential surface thereof in contact with the color reference plate, the eccentric cam rotated by a driving force of the drive motor; and
   a processor configured to execute a color reference data setting process to set, based on image data read for a plurality of number of times from the color reference plate by the image reading portion when the color reference plate is being oscillated by the oscillation portion, color reference data to be used for shading correction executed on image data read from the document sheet by the image reading portion, wherein
   a reading cycle at which the image data is read by an amount corresponding to a single line and an oscillation cycle at which the color reference plate oscillates are set to be different from each other,
   an attachment portion comprising a slide groove having a predetermined width and to which the color reference plate is attached is formed on the image reading device,
   the color reference plate comprises a protruding portion provided at an end part on a side of the urging direction and an engagement portion that is fitted into the slide groove,
   the eccentric cam is configured to oscillate the color reference plate in a range movable within the slide groove by making contact with the protruding portion of the color reference plate urged in the urging direction by the spring, and rotating,
   the image reading portion is disposed in a unit case in which the document sheet conveying portion is housed, the color reference plate is disposed on a cover member that is openable and closable with respect to the unit case, and the color reference data setting process calculates, for each of the photoelectric conversion elements, an average of the image data read from different positions along the primary scanning direction in the color reference plate when the color reference plate is being oscillated in the primary scanning direction by the oscillation portion, and sets, as the color reference data, the average of the image data or a value obtained by assigning the average of the image data to a predetermined arithmetic expression.

2. An image forming apparatus comprising:
the image reading device according to claim 1; and
an image forming portion configured to form an image based on image data read by the image reading device.

3. The image reading device according to claim 1, further comprising:
a switch portion configured to block transmission of the driving force from the drive motor to the eccentric cam in a non-actuation state, and transmit the driving force from the drive motor to the eccentric cam in an actuation state, wherein
the processor is configured to set the switch portion in the non-actuation state when the image reading portion reads an image, and set the switch portion in the actuation state when the color reference data setting portion sets the color reference data.

4. An image reading device comprising:
a document sheet conveying portion comprising a conveying roller configured to convey a document sheet and a drive motor configured to drive the conveying roller;
an image reading portion fixed at a predetermined position on a route on which the document sheet is conveyed by the document sheet conveying portion, including a plurality of photoelectric conversion elements disposed side-by-side in a primary scanning direction, and configured to read an image from the document sheet;
a color reference plate disposed opposingly to the image reading portion and having a predetermined reference color at a part thereof opposing the image reading portion;
an oscillation portion capable of oscillating the color reference plate in at least the primary scanning direction, the oscillation portion comprising an urging portion configured to urge the color reference plate in an urging direction and a movement portion configured to intermittently move the color reference plate in a direction opposite of the urging direction, wherein:
the urging portion comprises a spring configured to urge the color reference plate in the urging direction; and the movement portion comprises an eccentric cam capable of rotating while having an outer circumferential surface thereof in contact with the color reference plate, the eccentric cam rotated by a driving force of the drive motor; and a processor configured to execute a color reference data setting process to set, based on image data read for a plurality of number of times from the color reference plate by the image reading portion when the color reference plate is being oscillated in the primary scanning direction by the oscillation portion, color reference data to be used for shading correction executed on image data read from the document sheet by the image reading portion, wherein a reading cycle at which the image data is read by an amount corresponding to a single line and an oscillation cycle at which the color reference plate oscillates are set to be different from each other, an attachment portion comprising a slide groove having a predetermined width and to which the color reference plate is attached is formed on the image reading device, the color reference plate comprises a protruding portion provided at an end part on a side of the urging direction and an engagement portion that is fitted into the slide groove, the eccentric cam is configured to oscillate the color reference plate in a range movable within the slide groove by making contact with the protruding portion of the color reference plate urged in the urging direction by the spring, and rotating, the image reading portion is disposed in a unit case in which the document sheet conveying portion is housed, the color reference plate is disposed on a cover member that is openable and closable with respect to the unit case, and the color reference data setting process extracts, for each of the photoelectric conversion elements, image data that is closest to the reference color of the color reference plate from among the image data of an amount corresponding to multiple lines, and uses the extracted image data as image data corresponding to the photoelectric conversion element.

5. The image reading device according to claim 4, further comprising:
a switch portion configured to block transmission of the driving force from the drive motor to the eccentric cam in a non-actuation state, and transmit the driving force from the drive motor to the eccentric cam in an actuation state, wherein
the processor is configured to set the switch portion in the non-actuation state when the image reading portion reads an image, and set the switch portion in the actuation state when the color reference data setting portion sets the color reference data.

* * * * *